US006356362B1

(12) United States Patent
Ostromoukhov

(10) Patent No.: US 6,356,362 B1
(45) Date of Patent: Mar. 12, 2002

(54) HALFTONING BY ENHANCED ERROR DIFFUSION

(75) Inventor: Victor Ostromoukhov, Lausanne (CH)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/184,551

(22) Filed: Nov. 2, 1998

(51) Int. Cl.$^7$ .................................................. G06K 9/36
(52) U.S. Cl. ........................................ 358/1.9; 382/252
(58) Field of Search .................... 358/1.9, 462; 382/237, 382/251–253, 199, 266–269

(56) References Cited

U.S. PATENT DOCUMENTS

| | | | | |
|---|---|---|---|---|
| 5,251,023 A | * | 10/1993 | Arimoto et al. ............. | 358/529 |
| 5,276,535 A | | 1/1994 | Levien ........................ | 358/346 |
| 5,337,087 A | * | 8/1994 | Mishima ..................... | 348/405 |
| 5,422,742 A | | 6/1995 | Ostormoukhov ............ | 358/536 |
| 5,438,431 A | | 8/1995 | Ostormoukhov ............ | 358/457 |
| 5,535,020 A | | 7/1996 | Ulichney .................... | 358/457 |
| 5,557,709 A | | 9/1996 | Shu ............................. | 395/109 |
| 5,673,121 A | | 9/1997 | Wang ......................... | 358/456 |
| 5,684,932 A | | 11/1997 | Shu ............................. | 395/109 |
| 5,687,303 A | * | 11/1997 | Motamed et al. ........... | 395/117 |
| 5,696,602 A | | 12/1997 | Cooper ....................... | 358/457 |
| 5,701,366 A | | 12/1997 | Ostromoukhov ............ | 382/237 |
| 5,737,453 A | | 4/1998 | Ostromoukhov ............ | 382/275 |
| 5,796,435 A | * | 8/1998 | Noromura et al. .......... | 348/405 |
| 5,799,108 A | * | 8/1998 | Okahashi .................... | 382/205 |

FOREIGN PATENT DOCUMENTS

WO          95/27365          10/1995

OTHER PUBLICATIONS

V. Ostromoukhov, et al., "Artistic Screening", Computer Graphics Proceedings, SIGGRAPH '95, pp. 219–228.

V. Ostromoukhov, et al., "Two Approaches in Scanner–Printer Calibration: Colorimetric Space–Based vs. 'Closed–Loop'", Proceedings of the SPIE—The International Society of Optical Engineering, vol., 2170, 1994, pp; 133–142.

V. Ostromoukhov, et al., "Rotated Dispersed Dither: A New Technique For Digital Halftoning", Proceedings of the 21st International SIGGRAPH Conference, Jul. 1994, pp. 123–130.

V. Ostromoukhov, "Hermite Approximation For Offset Curve Computation", IFIP Transactions B (Applications in Technology), vol. B–9, 1993, pp. 189–196.

V. Ostromoukhov, "Reproduction Couler Par Trames Irregulieres Et Semi–Regulieres", 1995.

P. Emmel, et al., "A grid–based method for predicting the behaviour of colour printers", Proceedings of the Third IS&T/SID Color Imaging Conference, 1995, pp. 71–77.

I. Amidror, et al., "Spectral Analysis and Minimization of Moire Patterns in Color Separation", Journal of Electronic Imaging, vol. 3, No. 3, Jul. 1994, pp. 295–317.

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

Halftoning by error diffusion, enhanced so as to reduce the presence of structural artifacts in the halftoned output while avoiding an artificial increase in halftoning image noise. Specifically, error diffusion according to the invention divides the input gray level intensity range into different segments for purposes of both thresholding and error diffusion. Different error diffusion threshold masks are applied for each respective segment, and different error diffusion weights are applied for each respective segment, with a decision being made as to whether or not to apply a different threshold mask being based on the local image gradient.

64 Claims, 11 Drawing Sheets

Microfiche Appendix Included
(1 Microfiche, 42 Pages)

COLOR MANAGEMENT SYSTEM

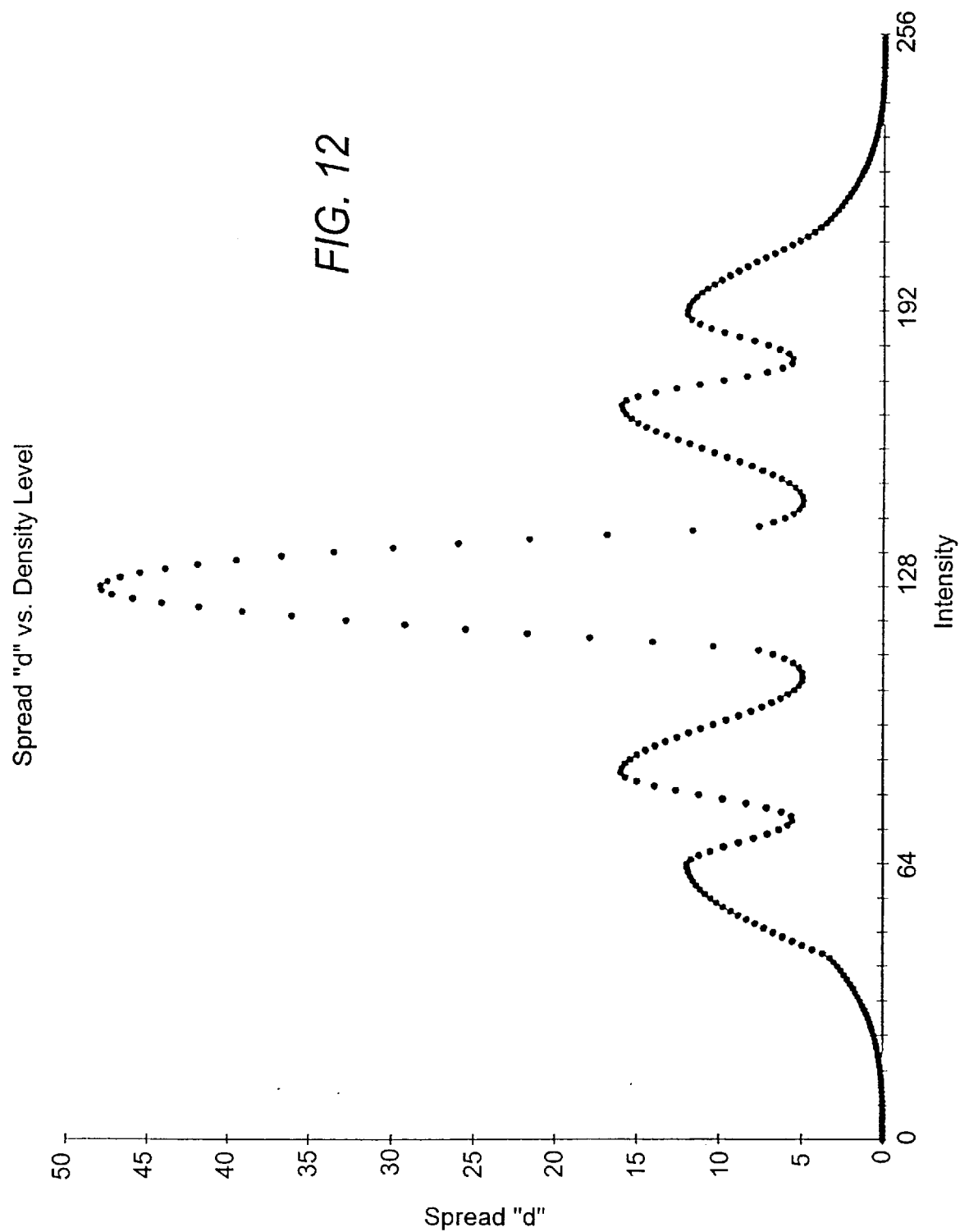

HALFTONING BY ENHANCED ERROR DIFFUSION

BACKGROUND OF THE INVENTION

This application is being filed with a microfiche appendix of computer program listings consisting of one (1) fiche having 42 frames.

A portion of the disclosure of this patent document contains material which is subject to copyright protection. The copyright owner has no objection to the facsimile reproduction by anyone of the document or the patent disclosure, as it appears in the Patent and Trademark Office patent file or records, but otherwise reserves all copyright rights whatsoever.

FIELD OF THE INVENTION

The present invention relates to halftoning by error diffusion, enhanced so as to reduce the presence of structural artifacts in the halftoned output while avoiding an artificial increase in halftoning image noise. Specifically, error diffusion according to the invention divides the input gray level intensity range into different segments for purposes of both thresholding and error diffusion. Different error diffusion threshold masks are applied for each respective segment, and different error diffusion weights are applied for each respective segment, with a decision being made as to whether or not to apply a different threshold mask being based on the local image gradient of the image.

DESCRIPTION OF THE RELATED ART

Error diffusion halftoning, as generally described in the seminal works by Floyd, Steinberg and Stucki, has become one of the most popular techniques for producing halftoned image output based on a continuous tone image input. Particularly in connection with computerized images, where each input pixel is represented by multi-level data such as an 8-bit gray scale or 24-bit color value, error diffusion halftoning has been found to yield pleasing results in images printed with binary or limited level output printers such as color ink jet printers and the like. Error diffusion tends to enhance edge sharpness and further tends to preserve fine image detail while yielding an overall pleasing image.

Generally speaking, error diffusion proceeds in accordance with the following steps. First, a pixel in the continuous tone image is compared against a threshold (or ranges of thresholds for an output device with several levels) so as to determine what output value should be printed by the image output device. For example, in the case of a binary printer (meaning a printer that outputs at each pixel either a dot or an absence of a dot), the threshold may be ½ of the intensity range, with a pixel being printed if the continuous tone value exceeds ½ and with no pixel being printed if the continuous tone value does not exceed ½. Then, the error between the continuous tone input and the actual output value is calculated. This error is diffused to adjacent pixels using predetermined weighting coefficients, so that predesignated proportions of the error are added to the original image value of adjacent pixels. Processing then proceeds with another pixel in a predetermined scan direction. When it comes time to threshold one of the adjacent pixels so as to determine whether or not to print a dot, the determination is based on the original value plus any accumulated errors.

Because of the exceedingly good image output obtained from error diffusion halftoning, a tremendous amount of effort has been expended on variations of the basic Floyd Stucki Steinberg technique so as to yield images of improved quality. Thus, various researchers have proposed changes to thresholding, changes to error diffusion coefficients, and changes in scan patterns, so as to improve error diffusion output.

Despite the amount of research aimed at error diffusion, there are several lingering problems. One of these problems concerns the formation of artifacts in the halftoned output. These artifacts form when error diffusion leads to repetitive output. Repetitive output can cause worm-like structural artifacts to appear in the halftoned output, particularly in areas of highlights such as extremely light or dark areas of an image. FIG. 1, for example, is the output 10 from conventional error diffusion halftoning, for each of 24 gray patches representing the first 24 out of 256 continuous tone gray levels. As seen in FIG. 1 at extremely light gray level highlights, repetitive output has caused worm-like artifacts such as those at 11 and 12.

Repetitive output can also cause regular patterns such as a checkerboard pattern to appear in the output. For example, FIG. 2 is the output of conventional error diffusion halftoning for a continuous tone gray wedge that varies from full dark gray (or black) to full light gray (or white). As seen at 50% gray, the halftoned output 16 has a regularized checkerboard artifact caused by repetitive output. The same artifact can be seen to a lesser degree at 25% gray and 75% gray.

Both kinds of structural artifacts are visually distracting and detract from the overall quality of the image. Moreover, in connection with color printing, the existence of regular patterns such as a checkerboard pattern can, when color components are overlaid, result in severe color shifts which manifest themselves as discolored halos of color around solid or gradually varying color regions. These structural artifacts manifest themselves in particularly displeasing ways at intensity values corresponding to integral fractions of the intensity range. Thus, a severe structural artifact is created at a intensity value of ½ (i.e., 50% gray), with structural artifacts of lesser visibility being observed at ⅓, ⅔, ¼, ¾, ⅕, ⅖, ⅗, etc. (i.e., integral fractions) of the intensity range.

The inventor of this application has previously proposed one technique for reducing the existence of artifacts. Thus, in U.S. Pat. No. 5,737,453, "Enhanced Error-Diffusion Method For Color Or Black-And-White Reproduction", the inventor herein proposed a technique for reducing halftoning artifacts by adjusting the threshold used in the halftoning decision, and by adjusting the coefficients of weights used to diffuse error. The technique described therein produced significantly reduced structural artifacts through a process that can inaccurately be conceptualized as introducing noise into the thresholding and the error diffusion process.

SUMMARY OF THE INVENTION

The inventor has since recognized that improved performance can be obtained by adjusting the amount of noise introduced into the thresholding and error diffusion process based on the amount of higher frequency spatial characteristics of the input image, such that when an input image naturally possesses a fair degree of noise (as is often the case when the input image is a natural image rather than a computer-generated image), there is less reason to introduce additional noise into the halftoning process.

It is an object of the invention to capitalize on the inventor's recognition that certain images need lesser amounts of noise injected into the halftoning and error diffusion process, by providing improved error diffusion halftoning.

According to one aspect of the invention, plural threshold masks are provided for use during error diffusion processing. Each thresholding mask has only a limited number of values, such as three values, with two of the values being centered around a central value, and with each different one of the plural threshold masks being provided for a different segment of the input intensity range. Preferably, a separate threshold mask is provided for each and every input intensity value. The spread of values in each threshold mask varies based on its corresponding intensity level. The spread increases at each intensity range corresponding to formation of artifacts, and results, for example, in a large spread at ½ of the intensity range, and correspondingly smaller spreads at ⅓, ¼, ⅕, etc. of the intensity range. At intervening non-integral fractions of the intensity range, the spread is reduced. Preferably, the spread of each intensity mask is derived empirically, based on the input/output characteristics of the overall halftoning process including the printed output of a particular model of printer, so as to result in injection of precisely enough noise to disrupt the formation of artifacts in images of low gradient.

A different threshold mask is selected for halftoning based on the intensity value of the input image. Because each threshold mask provides only the amount of spread needed to disrupt formation of artifacts, noise is not unnecessarily injected into the overall halftoning process.

In a further aspect, the invention decides whether to apply a selected one of the threshold masks, or whether to apply a fixed threshold such as 50% gray, based on the presence of high frequency spatial characteristics of the input image. Preferably, the presence of high frequency spatial characteristics of the input image is determined based on a simple gradient test, so that the gradient at each target pixel of the halftoning process is determined based on whether there is a significant (for example, two or three levels out of 256 intensity levels) change relative to adjacent pixels. If there is a significant change from adjacent pixels, then a fixed threshold is applied in the halftoning process; on the other hand, if there is not a significant change, then one of the predetermined threshold masks is selected based on the intensity level of the input image.

Thus, in this aspect of the invention, whether to apply a threshold mask or a fixed threshold is decided based on local image gradient. Because the decision as to whether to use a threshold mask or a fixed threshold is made based on local gradient and/or high frequency spatial characteristics, the invention avoids unnecessary injection of image noise in those areas of the image which by themselves already have sufficient spatial characteristics to avoid formation of artifacts.

In a related aspect of the invention, the range of input intensities is divided into plural segments, with different error diffusion weights being provided for each different segment. In the aforementioned U.S. Pat. No. 5,737,453, which is incorporated herein by reference as if set forth in full, different error diffusion weights were provided at highlight areas of an image, such as extremely light and extremely dark areas. In the present invention, an additional segment is provided at the mid-tone (i.e., 50% gray) segment, with weights in the mid-tone segments being selected so as to decrease the tendency of the error diffusion process to form regular checkerboard patterns. Specifically, in U.S. Pat. No. 5,737,453, error diffusion weights in highlight areas were selected to provide very stable and even distribution of errors, so as to cause a corresponding stable and even distribution of printed dots with reduced worm-like artifacts. In contrast, in the mid-tone segment of the present invention, error diffusion weights are selected to provide unstable and odd distribution of errors, with a corresponding unstable and odd distribution of printed dots so as to prevent formation of an even checkerboard pattern. Thus, error diffusion coefficients in highlight and mid-tone segments are preferably different; and preferably there is a transition region around the mid-tone segment from standard error diffusion weights to the specialized weights of the invention's mid-tone segment.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 11 and 12 show graphs of how spread varies as a function of the input intensity value.

DETAILED DESCRIPTION OF THE PREFERRED EMBODIMENT

Figure 1:
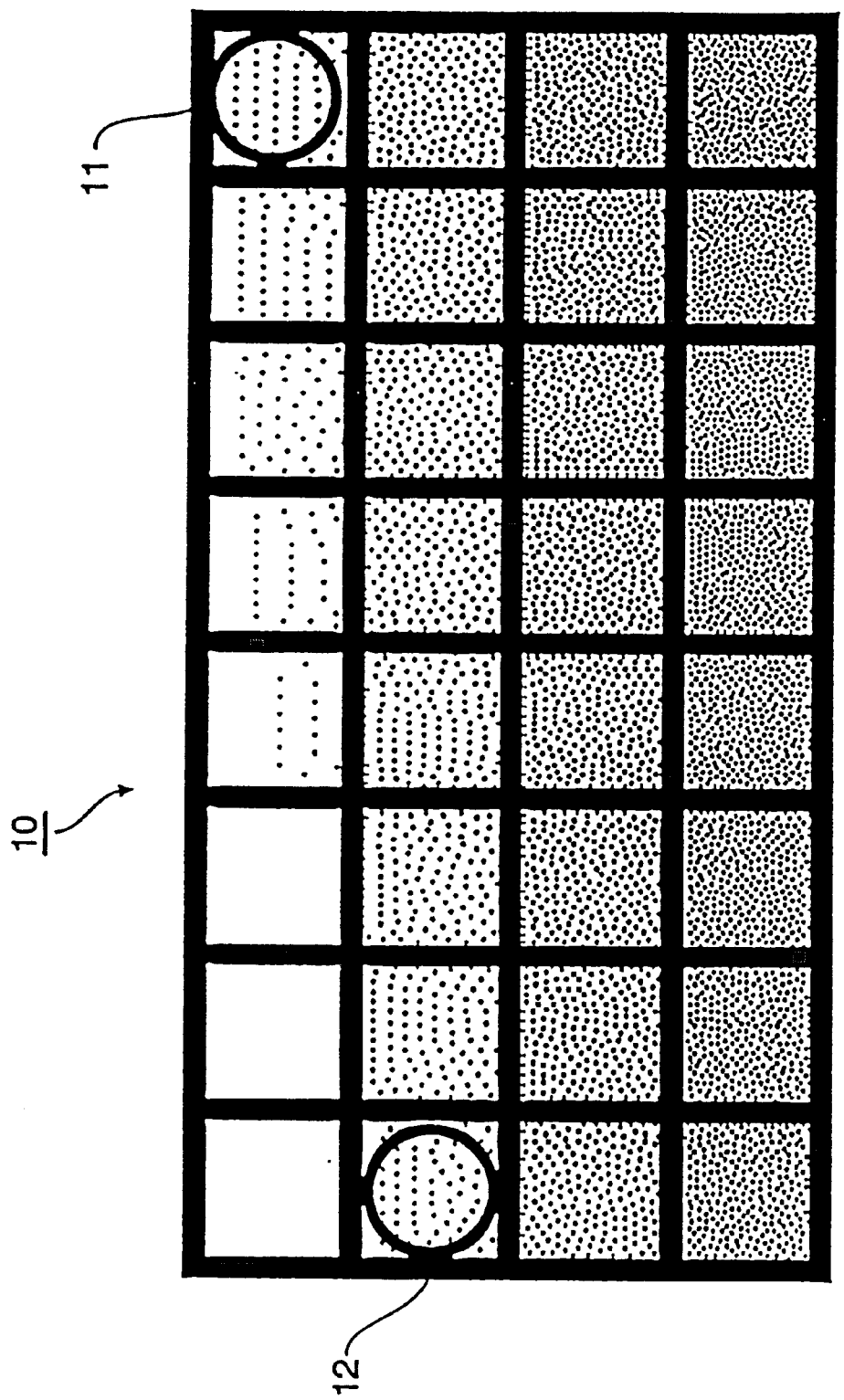
FIG. 1 shows a representative halftone image using conventional error diffusion halftoning.
Figure 2:
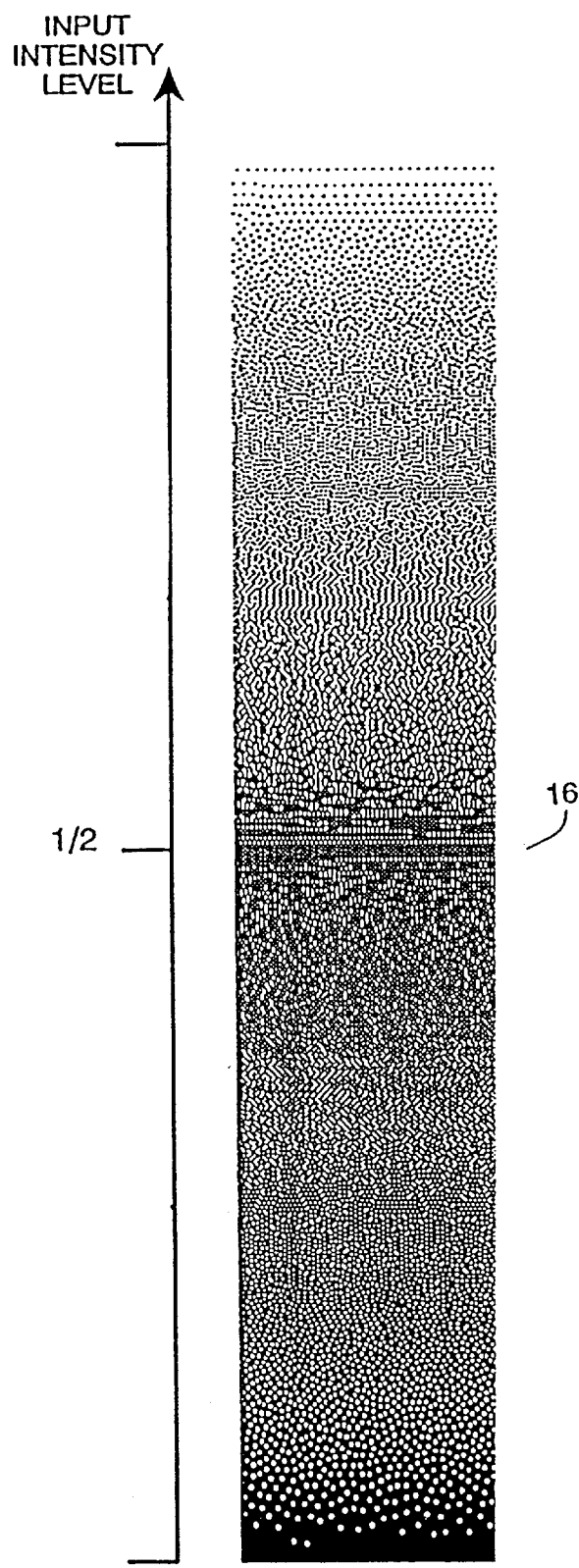
FIG. 2 shows a representative halftone image using conventional error diffusion halftoning for a continuous tone gray wedge.
Figure 3:
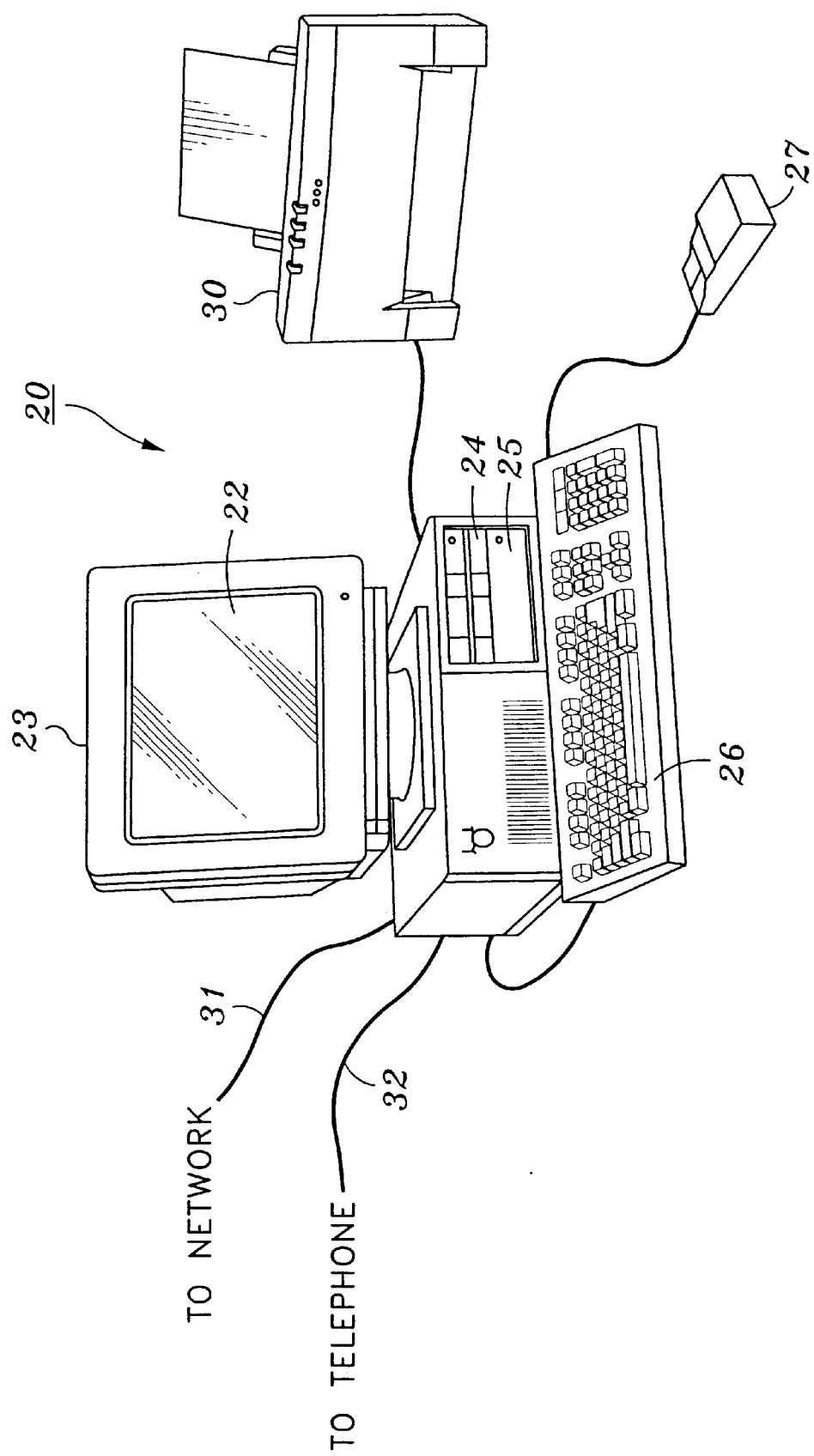
FIG. 3 is a view showing the outward appearance of representative computing equipment which incorporates enhanced error diffusion according to the invention.

FIG. 3 is a view showing the outward appearance of representative computing equipment which incorporates enhanced error diffusion according to the invention. Shown in FIG. 3 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, and a pointing device 27 such as a mouse or the like which is also provided to permit manipulation of objects on display screen 22. A conventional printer 30, such as a monotone or color laser beam printer or bubble jet printer, is also provided. Also provided are connections to a network 31 or to an ordinary voice telephone line 32, both for sending and receiving color image data as well as other files such as files which include program instruction sequences by which computing equipment 20 is operated.

While an ink jet printer is presently preferred, any printer and preferably a color printer which forms full color images by mixing colorants in amounts set by corresponding color component values, such as a color laser beam printer or color thermal wax printer or the like, is suitable in the practice of the invention. In addition, although a binary printer is preferred (meaning a printer that is able to output, at each pixel, only a dot or the absence of a dot), multi-level printers are also usable in the practice of the invention.

In accordance with operator instructions, and under control of the windowing operating system, stored application programs such as graphics application programs, drawing application programs, desktop publishing application programs and the like, are selectively activated to process and to manipulate data. Also in accordance with operator instructions, and based on those stored application programs, commands are issued to display images on monitor 23 and to print images appearing on monitor 23, and those images are then printed on printer 30 as described more fully hereinbelow.

Figure 4:
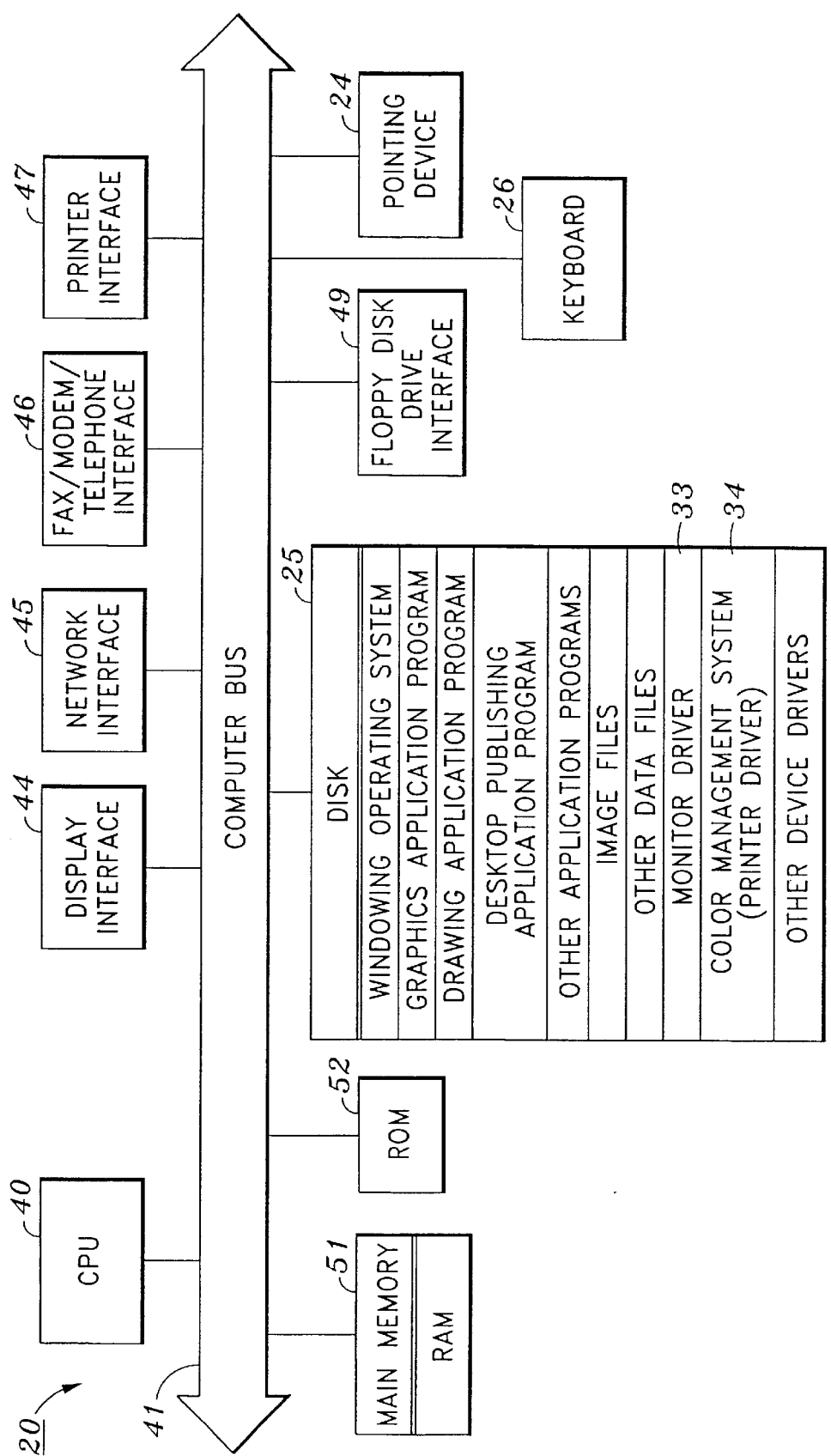
FIG. 4 is a detailed block diagram showing the internal construction of computing equipment.

FIG. 4 is a detailed block diagram showing the internal construction of computing equipment 20. As shown in FIG. 4, computing equipment 20 includes a central processing unit (CPU) 40 such as programmable microprocessor interfaced to a computer bus 41. Also interfaced to computer bus 41 is display interface 44, network interface 45 for interfacing to network 31, fax/modem/telephone interface 46 for interfacing to telephone 32, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31 or floppy disk drive 24) into main memory 51 and executes those stored program instruction sequences out of main memory 51.

ROM (read only memory) 52 is provided for storing invariant instruction sequences such as start-up instruction sequences or basic input/output operating system (BIOS) sequences for operation of keyboard 26.

As shown in FIG. 4, and as previously mentioned, fixed disk 25 stores program instruction sequences for the windowing operating system and for various application programs such as a graphics application program, a drawing application program, a desktop publishing application program, and the like. In addition, stored on fixed disk 25 are color image files such as are displayed on monitor 23 or printed on printer 30 under control of a designated application program. Fixed disk 25 also stores a monitor driver 33 which controls how RGB color primary values are provided to display interface 44, and color management system 34 which is a printer driver for controlling how CMYK color component values are provided to printer interface 47 for printout by printer 30. Enhanced halftoning according to the invention, in this embodiment of the invention resides in color management system 34. Other device drivers are also stored on fixed disk 25, for providing appropriate signals to the various devices (such as the network) connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media on which a copy of color management system 34 is stored. The user would then install color management system 34 onto disk 25 by inserting the purchased floppy disk into floppy disk drive 24 and by commanding CPU 40 to copy color management system 34 from the floppy disk onto disk 25. It is also possible for the user, via telephone 32 and modem interface 46, or via network 31 and network interface 45, to download color management system 34 from a computerized bulletin board to which the drivers had previously been uploaded.

Figure 5:
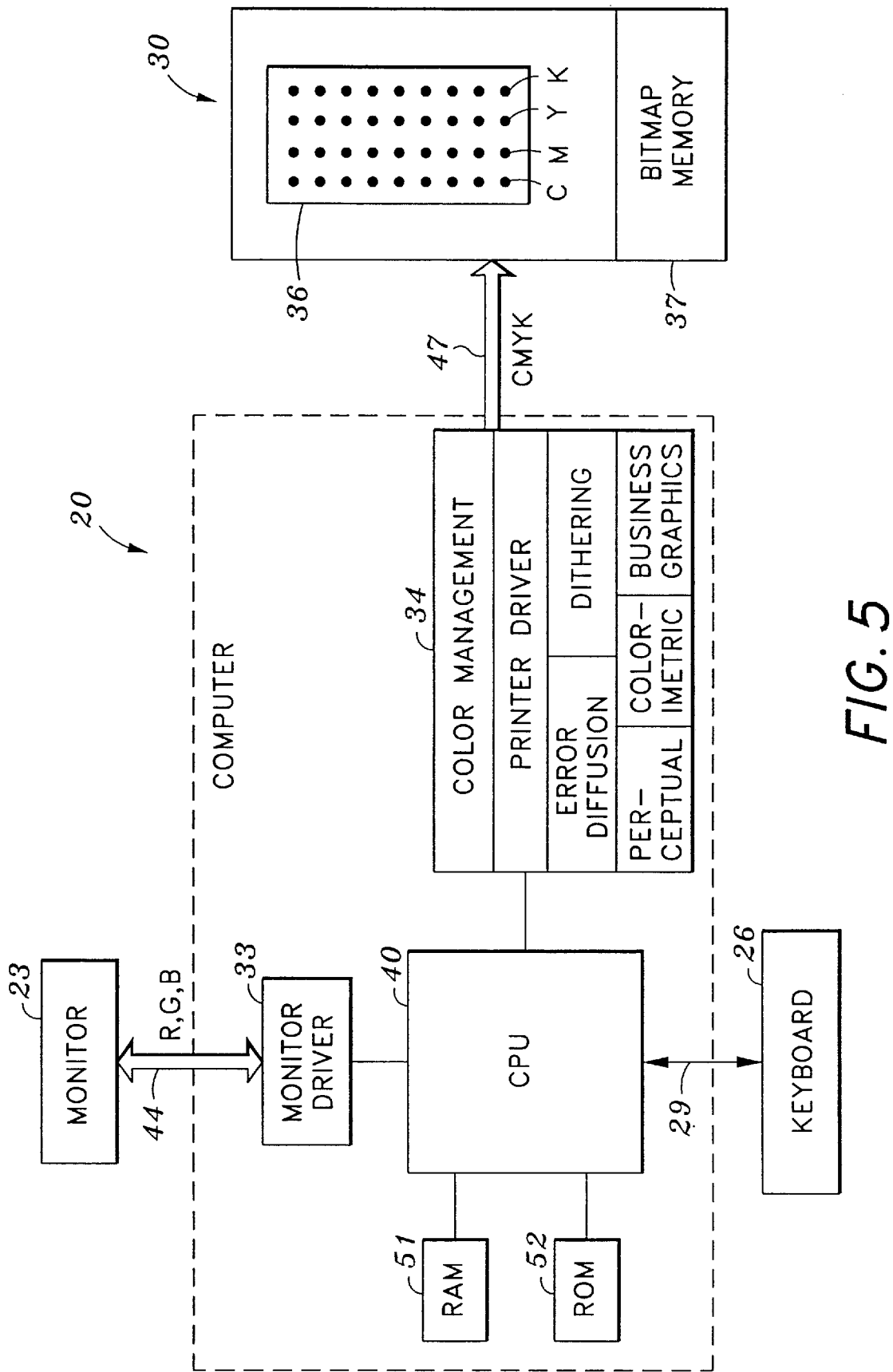
FIG. 5 is a functional block diagram showing how the computer interacts with the monitor and printer.

FIG. 5 is a functional block diagram showing how computer 20 interacts with monitor 23 and printer 30. Shown in FIG. 5 are computer 20 with monitor driver 33, color management system 34, CPU 40, RAM 51 and ROM 52, all arranged functionally rather than the structural view of FIG. 4.

As mentioned above, using keyboard 26, an operator can cause CPU 40 to execute stored program instructions which cause color images to be displayed on monitor 23 and which cause corresponding color images to be printed on color printer 30. Specifically, and in cooperation with the stored program instructions in the application program stored on disk 25, CPU 40 derives a color image, comprised of gray scale image data for each of three color primaries, for display on monitor 23. CPU provides the gray scale image data to monitor driver 33 which in turn derives gray-level RGB values for each pixel in the monitor 23. The RGB values are provided via display interface 44 to monitor 23 where those values are displayed. Since monitor 23 is a continuous tone analog device, the color image displayed on monitor 23 from the derived RGB values is a continuous tone image based on the gray-levels of each of the R, G and B values.

Upon request, CPU 40 also feeds the color image to color management system 34 for printing by color printer 30. Color management system 34 derives binary CMYK values for each pixel of the color image based on the continuous tone multi-level gray scale image data for each of the three color primaries provided from CPU 40. The color management system 34 allows selection, ordinarily by the user but in some cases automatically by CPU 40, of whether to halftone by error diffusion halftoning according to the invention or by conventional dither matrix halftoning, and also of which one of plural color rendering modes, here, a perceptual rendering mode, a colorimetric rendering mode, and a business graphics rendering mode, to use. Whichever one of the plural color rendering modes is selected, however, the ultimate purpose of color management system 34 is to halftone-process the gray scale image data for each of the color primaries provided from CPU 40 so as to obtain binary CMYK values, and to provide the binary CMYK values to printer 30 for printing.

More particularly, for each pixel of an image on monitor 23, color management system 34 converts the gray-level RGB value of the pixel into a binary halftone value for each of the CMYK color components printed by printer 30. For example, if each pixel of the image on monitor 23 is represented by a 24-bit RGB value (i.e., eight bits for R, eight bits for G, and eight bits for B), color management system 34 obtains a digital halftone value in which each of the CMYK color components is represented by a single bit indicating whether a dot of the respective color component is to be printed at a corresponding pixel position by printer 30.

Thereafter, color management system 34 feeds the CMYK values via printer interface 46 to printer 30 where they are stored in bitmap memory 37 within printer 30. Bitmap memory 37 may store a full bitmap image of the printed image, or it may store only a band or partial bitmap image. When sufficient color data, namely binary halftoned CMYK data, is stored in bitmap memory 37, a color print head 36 reciprocates across a platen adjacent a sheet of paper. In one possible arrangement, print head 36 includes 128 ink jet nozzles arranged in a four column by 32 row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bitmap memory 37 such that in one reciprocation of print head 36 across the platen, 32 rows of pixels are printed.

Figure 6:
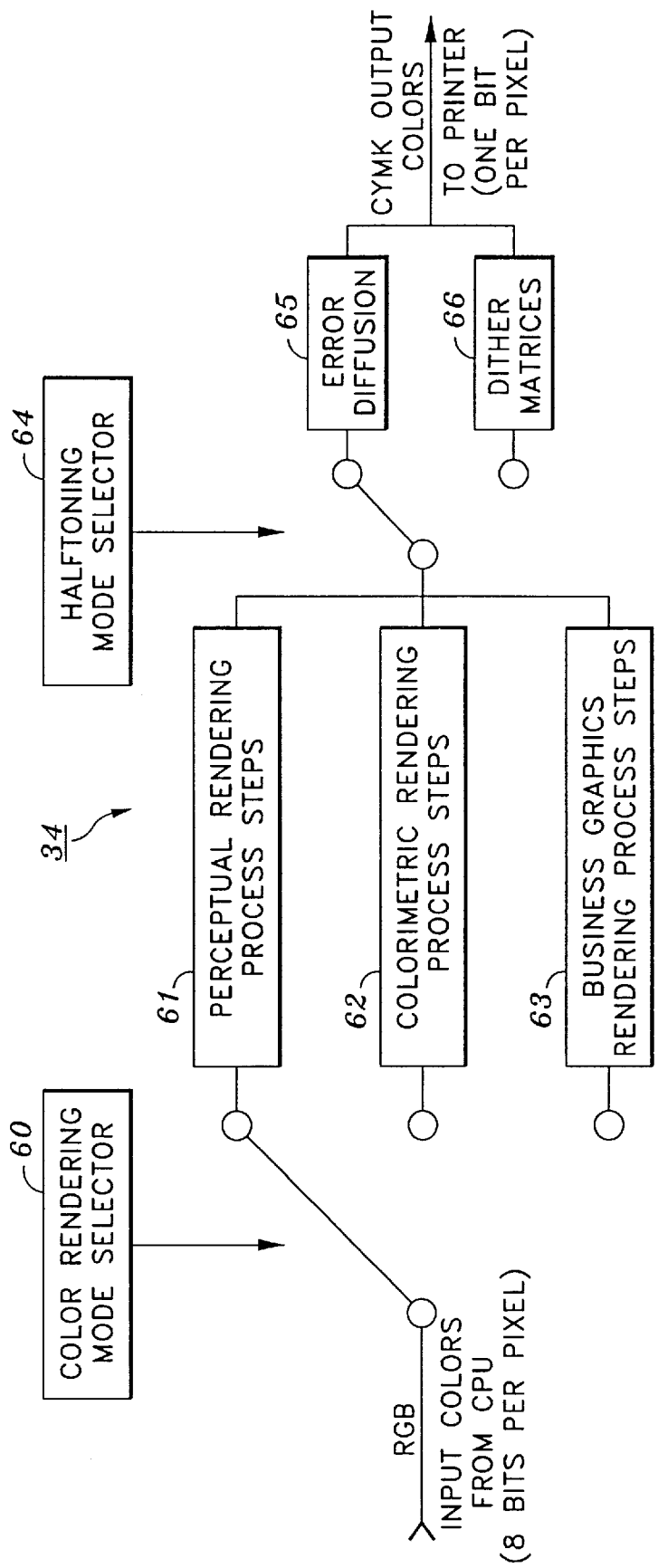
FIG. 6 is a view showing the functional arrangement of color management system.

FIG. 6 is a view showing the functional arrangement of color management system 34. The color management system shown in FIG. 14 includes plural different color rendering modes, each tailored to modify color image data from CPU 40 so as to meet some color objective. As shown in FIG. 6, color management system 34 includes perceptual rendering process steps 61 which are best suited to natural color images, colorimetric rendering process steps 62 which are best suited to match to a given color, and business graphics rendering process steps 63 which are best suited to high-saturation graphic images. Color management system 34 further includes a rendering mode selector 60 which allows selection between one of the plural rendering modes of the color management system. Preferably, rendering mode selector 60 is a user manipulable graphical user interface which allows a user, after commanding an image to be printed, to select one of the plural rendering modes by which color management system 34 is able to render the image. Alternatively, it is also possible for rendering mode selector 60 to be actuatable automatically under control of CPU 40, in which case CPU 40 would make automatic selection of the proper rendering mode. Such automatic selection may, for example, be made based on the type of application software which is generating the image, based on data or image type, based on data structure, based on a histogram or other analysis of color distribution in the image, or the like. For example, all BMP type data might have perceptual rendering automatically selected, while vector graphics might have business graphics rendering automatically selected, and so on.

Color management system 34 also includes a halftoning mode selector 64 which allows selection between halftoning by error diffusion process steps according to the invention or halftoning by conventional dithering process steps 66. Based on the mode selected by halftoning mode selector 64, gray scale image data for each of the three color primaries, as fed from CPU 40 and as modified by the color rendering mode selected by 60, are fed for appropriate processing to the selected one of the halftoning modes, so as to generate printer binary CMYK colorant values.

Figure 7:
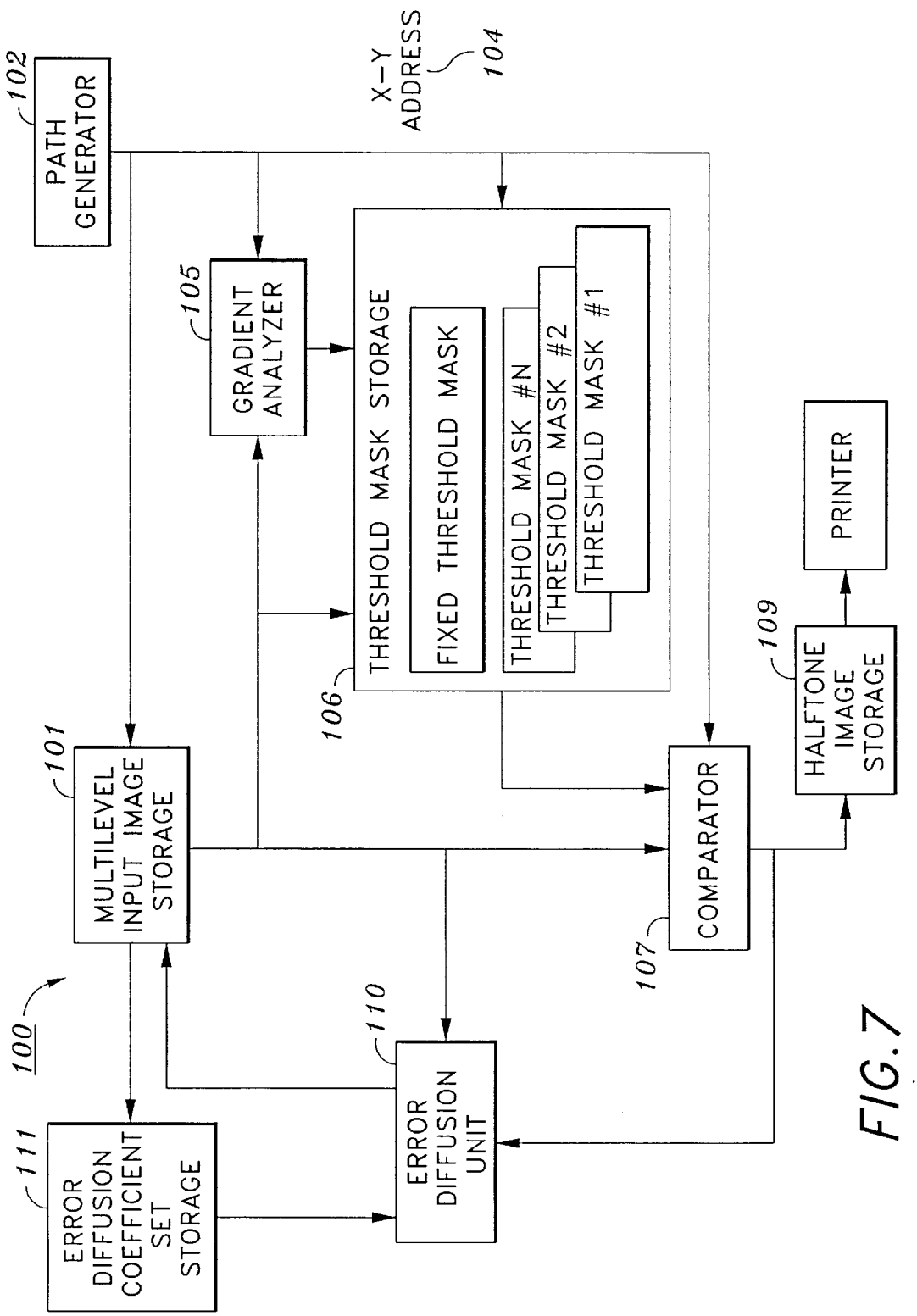
FIG. 7 is a functional block diagram of an apparatus for carrying out enhanced error diffusion halftoning according to the invention.

FIG. 7 is a functional block diagram of an apparatus (such as computing equipment 20) for carrying out enhanced error diffusion halftoning according to the invention. Apparatus 100 shown in FIG. 7 might be implemented in physical hardware, but more preferably the apparatus in FIG. 7 is implemented as software process steps in conjunction with enhanced error diffusion halftoning steps 65 (FIG. 6).

As shown in FIG. 7, enhanced error diffusion according to the invention includes an input image section 101 for storing a continuous tone multi-level input image. Preferably, enhanced error diffusion halftoning for the invention proceeds independently for each color component of the input color image, which at this point of the color management system has already been converted into continuous tone cyan, magenta, yellow and black components. Accordingly, in its preferred form, apparatus 100 operates independently for each different color component so as to yield halftoned output values for such color components. Alternatively, it is possible for the continuous tone color images to be processed together, so as to allow for cross correlation between each component, particularly the black color component.

In any event, a path generator 102 generates an (x,y) pixel address 104. The (x,y) pixel address is used to generate the scanning path through image data in storage section 101, such as a serpentine scanning path, a scan-line scanning path, a blue-noise-modified scanning path, and the like. For each pixel address so generated, a target pixel from input image storage section 101 is forwarded toward a gradient analyzer unit 105, which determines whether high frequency spatial characteristics are present in the image around the neighborhood of the target pixel, by detecting in the input image those regions that have a gradient, and those regions which do not. One simple technique for detecting gradient is simply to determine whether there is any difference at all between the value for a target pixel and the values in pixels adjacent the target pixel. If there is any difference at all, or if the difference exceeds some gradient threshold such as two or three intensity levels, then a gradient is detected. On the other hand, if there is no difference at all, or if the difference fails to exceed a gradient threshold, then gradient analyzer 105 determines that no gradient exists for the target pixel.

Other techniques may be used by gradient analyzer 105 for determining whether a gradient exists. For example, rather than using all adjacent pixels in both the x and y directions, gradient analyzer 105 might inspect only adjacent pixels in the scan path. In addition, it is possible for gradient analyzer to examine more than the closest adjacent pixels, and also to include pixels further away than two pixel adjacencies.

Threshold mask storage unit 106 stores plural different threshold masks, preferably including one threshold mask for each different possible intensity level of pixels in the input image. Alternatively, threshold mask storage unit 106 can store plural different threshold masks corresponding to different sections of the intensity range for the input image, such as eight different masks corresponding to eight different intensity sections of the input image range. The precise nature of the thresholds stored in the threshold masks is described below in connection with FIGS. 9 through 12, but generally speaking, the threshold masks store (x,y)-arranged threshold numbers, ranging between 0 and 255 in correspondence to the intensity levels of the continuous tone image data at each pixel, used for comparison purposes during error diffusion processing, with distribution of the threshold numbers in the mask being dependent upon the noise desired to be injected by the threshold mask. Specifically, as described in the summary of the invention, the spread of threshold numbers in each threshold mask corresponds conceptually (but inaccurately) to an injection of noise into the error diffusion processing. Because each threshold mask provides only the amount of spread needed to disrupt formation of repetitive outputs that cause undesired artifacts, noise is not unnecessarily injected into the overall halftoning process.

In addition to storing plural threshold masks, threshold mask storage unit 106 also stores a fixed threshold mask which includes only one threshold value. Of course, if memory resources are scarce, it is possible to store the fixed threshold mask as a single number since all values in the threshold mask are the same. Likewise, rather than storing plural threshold masks (one for each segment or intensity level), the threshold masks can be generated on-the-fly during halftoning processing, such as by application of scaled random numbers.

Based on whether a gradient is present as determined by gradient analyzer 105, and further based on the value of the target value in the input image, a threshold mask is provided to comparator 107. This process is described below in more detail in connection with FIG. 7, but generally speaking, a fixed threshold mask is provided in a case where a gradient already exists in the input image (corresponding to a situation where there is sufficient natural noise in the input image so as to avoid the introduction of output artifacts), whereas one of the plural different threshold masks is provided in a case where a gradient is absent, the precise one of the plural different threshold masks being dependent upon the intensity value of the target pixel in the input image.

Comparator 107 operates on each pixel of the continuous tone values stored in storage section 101 and for each pixel compares the continuous tone value with the threshold provided by mask storage section 106. The actual threshold to use is dependent upon the (x,y) address 104 provided by path generator 102. Based on the comparison, comparator 107 outputs a binary "one" for the pixel if a white output is desired, or a binary "zero" for the pixel if a colored (or black) output is desired. The output is stored in halftone image storage section 109, for printout by the printer. Meanwhile, error between the binary output stored in halftone image storage section 109, and the continuous tone multi-level value in the image storage section 101 for the target pixel, is output to error distribution unit 110.

Error distribution unit 110 calculates how the error is to be distributed to adjacent pixels, based on error distribution coefficients provided from storage section 111. Error distribution coefficient section 111 stores, for each different intensity level in the range of intensity levels for the input image, a set of error distribution coefficients for use in distributing error. One of the sets of error distribution coefficients is selected based on the intensity value of the target pixel in image storage section 101 (more precisely, based on the value of the target pixel plus any already-accumulated error from earlier error-diffusion-processing of adjacent pixels), and the selected set of error distribution coefficients is provided to error distribution unit 110. Based on the error distribution coefficients provided to it, and based also on the error provided by comparator 107, error distribution unit 110 distributes errors to adjacent pixels by adding them to the values in input image storage section 101. The process is thereupon repeated for each (x,y) pixel address 104, as generated by path generator 102, until all pixels in the input image storage section 101 have been processed.

Figure 8:
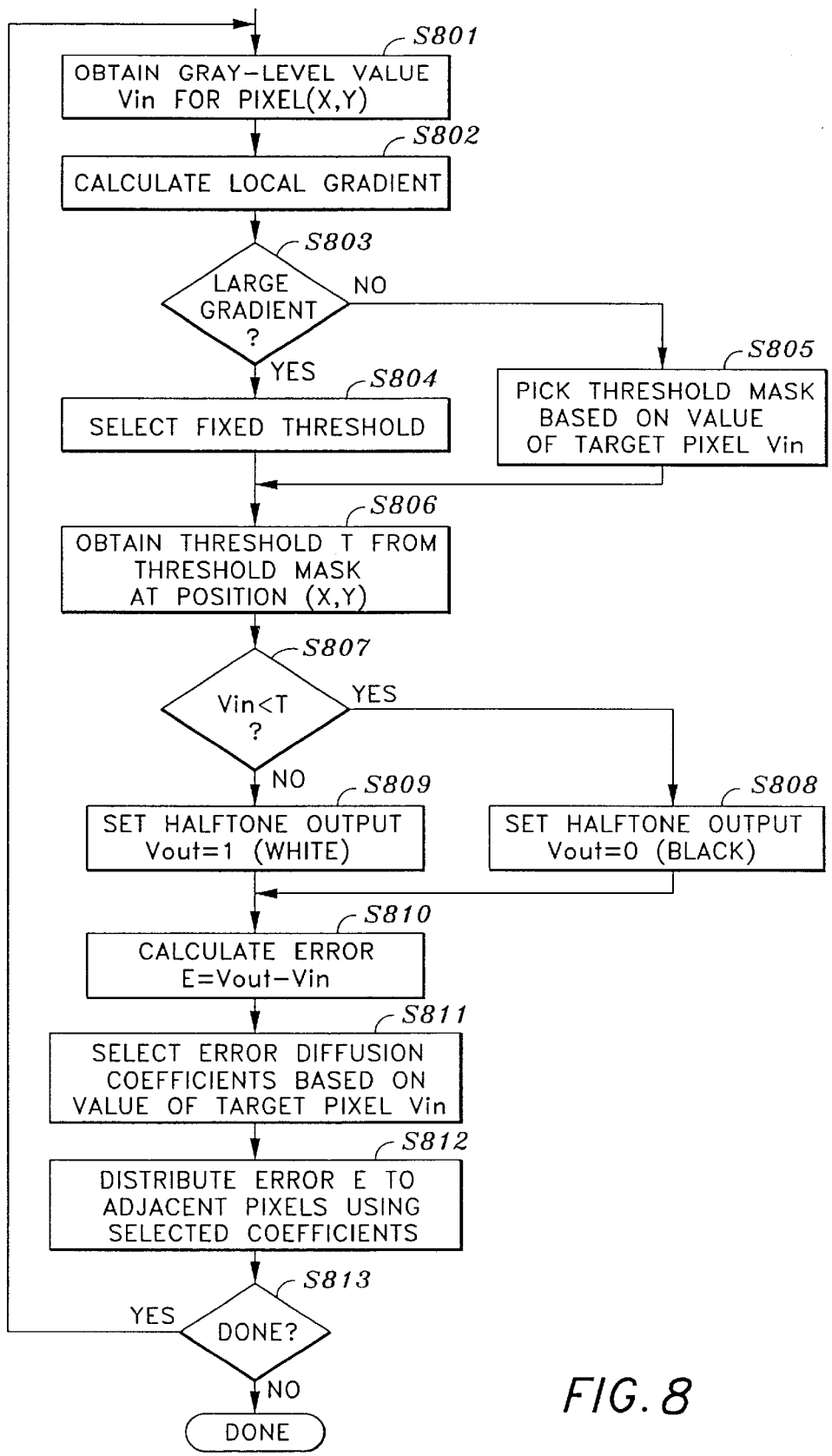
FIG. 8 is a flow diagram for explaining operation of the FIG. 7 arrangement.

FIG. 8 is a flow diagram for explaining operation of the FIG. 7 arrangement, by virtue of which enhanced error diffusion halftoning according to this embodiment the invention is obtained. FIG. 8 shows process steps stored in error diffusion steps 65 and executed by CPU 40 so as to obtain enhanced error diffusion. Briefly, according to FIG. 8, to halftone image data for a targeted one of plural pixels, a test is performed to determine whether high frequency spatial characteristics are present in the image data at the target pixel. A halftoning threshold is selected for the target pixel based on whether high frequency spatial characteristics are present at the target pixel, and in accordance with the intensity of the image data at the target pixel in a case where high frequency spatial characteristics are not present. A halftone output value is then determined for the target pixel based on a comparison between the selected threshold and the image data for the target pixel. Finally, the error between the halftone output value and the image data for the target pixel is diffused to pixels adjacent the target pixel.

In somewhat more detail, to halftone image data for each of plural pixels in the image, one of plural different threshold masks is selected based at least in part on intensity of image data for the target pixel (plus an already-accumulated error) and preferably also based on the presence of a gradient indicating high frequency spatial characteristics at the target pixel of the input image. A halftone output value for the target pixel is then determined based on a comparison between a threshold in the selected threshold mask and the image data plus accumulated error for the target pixel. Error between the halftone output value and the image data plus accumulated error is diffused to pixels adjacent the target pixel, with the diffusion coefficients preferably being selected based on the intensity of the image data plus accumulated error. It is one feature of the invention that each of the plural different threshold masks has only a limited number of threshold values whose spread is dependent upon the intensity value of the target pixel (or a segment of the input intensity range thereof).

In more detail, step S801 obtains a continuous tone multi-level value $V_{in}$ from image storage section 101 at address (x,y). In step S802, gradient analyzer 105 calculates a local gradient for the target pixel. If the gradient is absent or is insufficiently large, then step S803 causes flow to branch to step S805 which picks a threshold mask from threshold mask storage 106 based on the intensity value of the target pixel $V_{in}$. On the other hand, if the gradient is present or is sufficiently large, then step S804 selects a fixed threshold mask.

Flow then advances to step S806 which obtains a threshold T from the selected threshold mask at position (x,y). Then, in step S807, if $V_{in}$ is smaller than the threshold, then flow branches to step S808 in which the halftone output $V_{out}$ is set to "zero", corresponding to a black or colored pixel. On the other hand, if $V_{in}$ is not less than the threshold T, then flow advances to step S809 where comparator 107 sets the halftone output $V_{out}$ to "one", corresponding to no printed dot, or a white pixel.

Thereupon flow advances to step S810 in which error distribution unit 110 calculates an error E between $V_{out}$ and $V_{in}$. Flow then advances to step S811, in which a set of error distribution coefficients is selected from error distribution storage coefficient section 111, with the selection being based on the value $V_{in}$ of the target pixel. The set of error diffusion coefficients is provided to error distribution unit 110, which uses the selected error diffusion coefficients to distribute error E to adjacent pixels (step S812). Specifically, the distributed error is added back into appropriate gray level values for adjacent pixels, as currently stored in continuous tone input image storage section 101.

In step S813, if path generator 102 determines that more pixels still need to processed, then flow returns to step S801 for such processing. Otherwise, processing is completed, and binary halftone values stored in image storage section 109 are processed for printing by printer 30.

Figure 9:
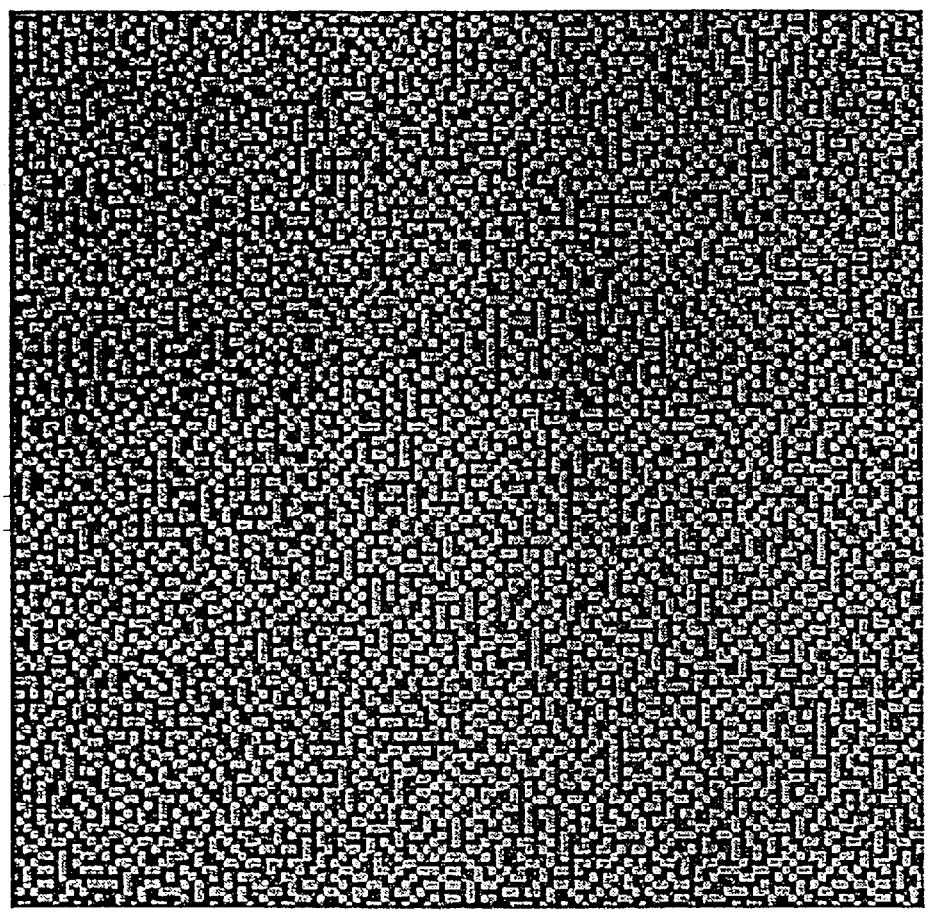
FIG. 9 is a view showing a representative threshold mask.

FIG. 9 is a view of a representative one of the plural threshold masks stored in threshold mask storage section 106. In general, each threshold mask is stored in matrix format and contains a set of threshold values T(x,y) with the threshold values having only a limited number of levels, such as three values with two of such values being centered around a central value. Preferably, the central threshold value corresponds to the center of the intensity range for the continuous tone data under consideration, which in this embodiment is 128. The two remaining threshold values differ from the central value by an amount "d", which is hereinafter referred to as the "spread" of the threshold mask. Conceptually, the spread corresponds to the amount of noise being injected by the halftoning process, with a larger spread corresponding to a greater amount of noise.

In FIG. 9, the exact values in the threshold mask are represented by increasingly darker gray squares for increasingly higher threshold values. The threshold values T(x,y) are preferably well dispersed, as described in the aforementioned U.S. Pat. No. 5,737,453.

Figure 10:
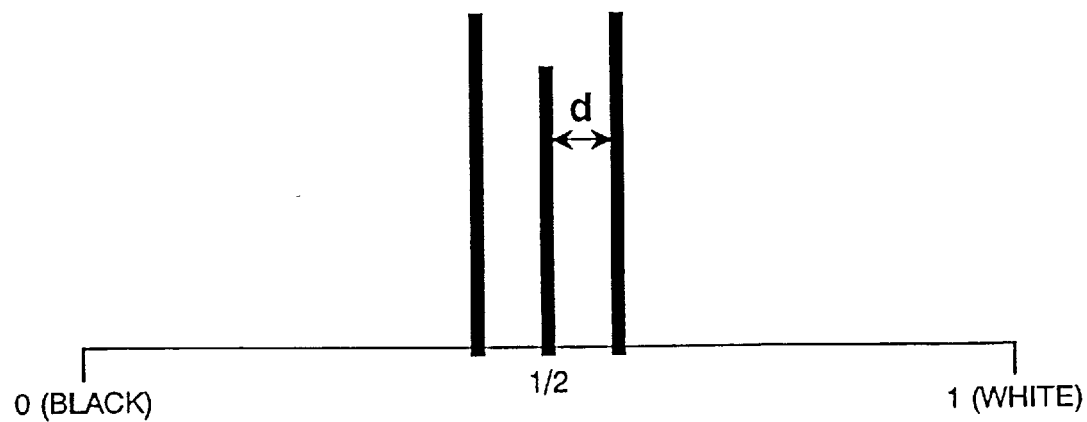
FIG. 10 illustrates a histogram showing the relative frequency of threshold values in the threshold mask.

FIG. 10 illustrates a histogram showing the relative frequency of threshold values in the threshold mask. As previously mentioned, only a limited number of threshold values are present; in this example, exactly three values are found including two values (128−d and 128+d) centered around a central value (128). The spread d of the threshold values varies between each threshold mask, in correspondence to the input intensity level for which the mask is to be used (i.e., 256 threshold masks, with one for each different intensity value), or in correspondence to the segment of the input intensity range to which the threshold mask corresponds (e.g., eight different threshold masks, corresponding to eight equally or non-equally sized segments of the intensity range).

Figure 11:
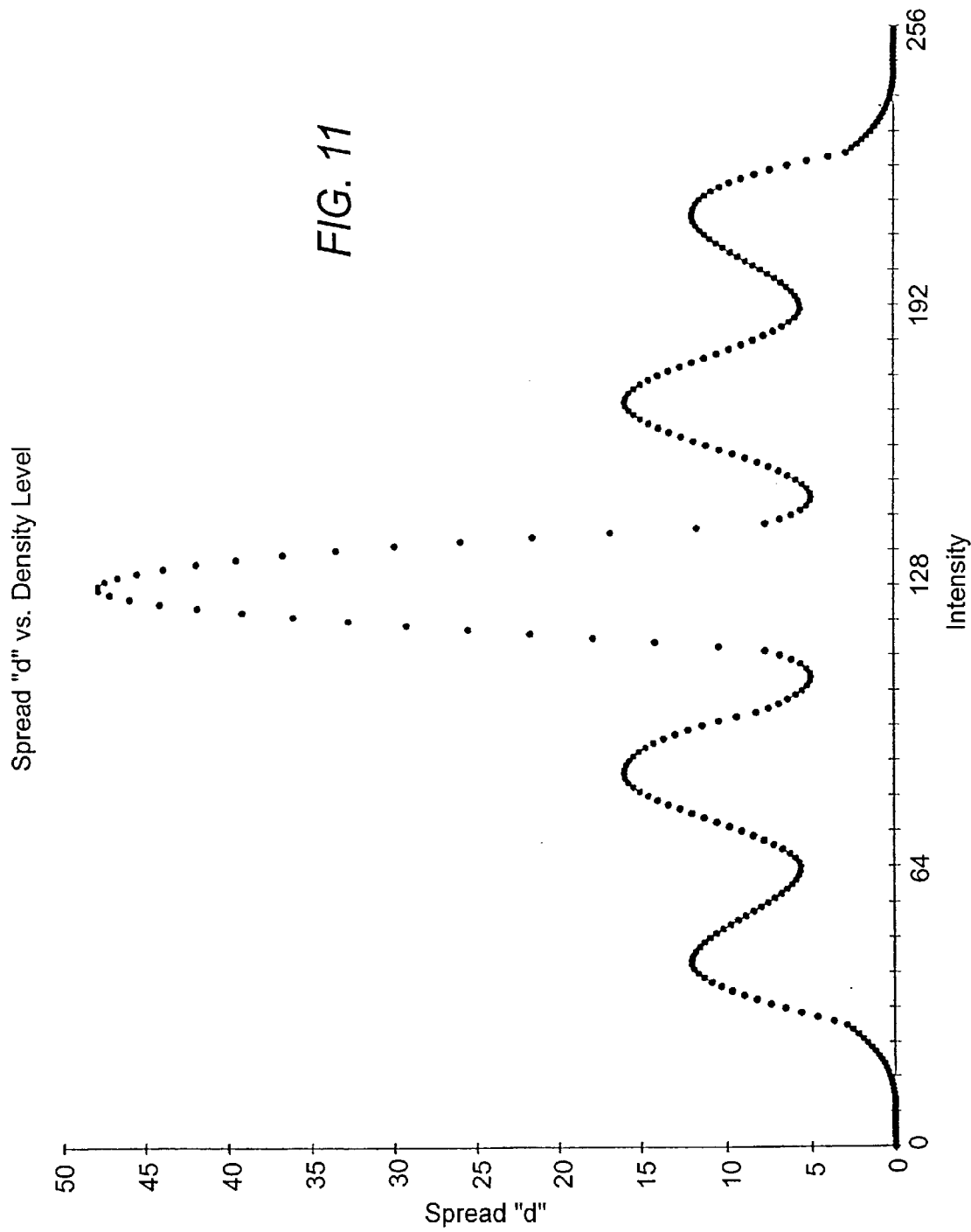

FIGS. 11 and 12 show graphs of how the spread d varies as a function of the input intensity value, for two different sets of threshold masks. As shown in FIG. 11, for values of continuous tone input level that are non-integral fractions, the value of spread d for the corresponding threshold mask is relatively low. On the other hand, at intermediate values corresponding to certain integral fractions of the continuous tone input level such as ⅙, ⅓, ½, ⅔ and ⅚, the spread "d" for the corresponding threshold mask is relatively high. In particular, the spread d for the threshold mask corresponding to a intensity of exactly one half is greatest of all. Preferably, the values of d are determined empirically, based on the amount of noise that needs to be injected into the halftoning process in order to break up repetitive output patterns that result in unwanted artifacts.

FIG. 12 shows another set of values for the spread "d" for threshold masks. Like FIG. 11, FIG. 12 emphasizes noise for certain integral fractions of the intensity range, in this case ¼, ⅓, ½, ⅔ and ¾ of the intensity range.

Software code implementing one representative embodiment is attached in the microfiche appendix. The software code includes four different representative sets of error diffusion coefficients for use with the invention. Generally speaking, each set of error diffusion coefficient is arranged such that different error diffusion weights are provided in each different segment of the plural segments that together constitute the entire range of input intensities. Specifically, different error diffusion weights are provided at highlight areas of the image than are provided at intermediate areas of the image, and an additionally different set of error diffusion weights is provided at the mid-tone (50% gray) segment, with the weights in the mid-tone segment being selected so as to decrease the tendency of the error diffusion process to form regular checkerboard patterns. In particular, error diffusion coefficients in highlight areas are selected to provide very stable and even distribution of errors, so as to cause a corresponding stable and even distribution of printed dots with reduced worm-like artifacts. In contrast, in the mid-tone segment, error diffusion coefficients are selected to provide unstable and odd distribution of errors, with a correspondingly unstable and odd distribution of printed dots so as to prevent formation of an even checkerboard pattern. Thus, error diffusion coefficients in highlight and mid-tone segments are preferably different; and preferably there is a transition region around each such segment so as to blend the transition to otherwise conventional error diffusion coefficients.

It is emphasized that several changes may be applied on the above-described system without departing from the teaching of the invention. It is intended that all the matter contained in the present disclosure, or shown in the accompanying drawings, shall be interpreted as illustrative rather than limiting.

What is claimed is:

1. A method for halftoning image data for a targeted one of plural pixels, comprising the steps of:

testing to determine whether high frequency spatial characteristics are present in the image data at the target pixel;

selecting a halftoning threshold for the target pixel, the halftoning threshold being selected based on whether high frequency spatial characteristics are present at the target pixel, and further being selected in accordance with intensity of the image data at the target pixel in a case where high frequency spatial characteristics are not present;

determining a halftone output value for the target pixel based on a comparison between the selected threshold and the image data for the target pixel; and diffusing error between the halftone output value and the image data for the target pixel, the error being diffused to pixels adjacent the target pixel.

2. A method according to claim 1, wherein image data for the target pixel is comprised of original image data plus accumulated error.

3. A method according to claim 1, wherein in said testing step, the presence of high frequency spatial characteristics is determined based on a gradient between image data for the target pixel and at least one pixel adjacent the target pixel.

4. A method according to claim 1, wherein in a case where said testing step determines that high frequency spatial characteristics are not present, said selecting step selects a halftoning threshold whose spread varies from a fixed threshold in dependence on intensity of the image data.

5. A method according to claim 4, wherein the spread increases at each intensity corresponding to formation of artifacts.

6. A method according to claim 5, wherein the spread increases at each intensity corresponding to an integral fraction of the intensity range.

7. A method according to claim 6, wherein at intervening non-integral fractions of the intensity range, the spread is reduced.

8. A method according to claim 1, wherein in a case where said testing step determines that high frequency spatial characteristics are not present, said selecting step comprises the steps of selecting one of plural threshold masks based on intensity of the image data for the target pixel, and selecting a halftoning threshold from the selected threshold mask.

9. A method according to claim 8, wherein each of said plural threshold masks has only a limited number of threshold values, with spread of values in each such threshold mask varying based on its corresponding intensity level.

10. A method for halftoning image data for each of plural pixels, comprising the steps of:
   determining whether to apply one of plural threshold masks, or whether to apply a fixed threshold, based on the presence of high frequency spatial characteristics of the input image;
   selecting, in a case that one of plural threshold masks is to be applied, one of said plural threshold masks based on intensity of the image data for a target pixel plus an accumulated error;
   determining a halftone output value for the target pixel based on a comparison between a selected threshold and the image data plus accumulated error for the target pixel; and
   diffusing error between the halftone output value and the image data plus accumulated error for the target pixel, the error being diffused to pixels adjacent the target pixel.

11. A member according to claim 10, wherein each thresholding mask has only a limited number of threshold values, with each different one of the plural threshold masks being provided for a different segment of the input intensity range.

12. A method according to claim 10, wherein each thresholding mask has only a limited number of threshold values, with a separate threshold mask being provided for each different input intensity value.

13. A method according to claim 10, wherein the spread of values in each threshold mask varies based on its corresponding intensity level.

14. A method according to claim 10, wherein the spread increases at each intensity range corresponding to formation of artifacts.

15. A method according to claim 14, wherein at intervening non-integral fractions of the intensity range, the spread is reduced.

16. A method according to claim 10, wherein the presence of high frequency spatial characteristics of the input image is determined based on a gradient test by which the spatial characteristics at each target pixel are determined based on whether there is a significant change relative to adjacent pixels.

17. An apparatus for halftoning image data for each of plural pixels, said apparatus comprising:
   means for testing to determine whether high frequency spatial characteristics are present in the image data at the target pixel;
   means for selecting a halftoning threshold for the target pixel, the halftoning threshold being selected based on whether high frequency spatial characteristics are present at the target pixel, and further being selected in accordance with intensity of the image data at the target pixel in a case where high frequency spatial characteristics are not present;
   means for determining a halftone output value for the target pixel based on a comparison between the selected threshold and the image data for the target pixel; and
   means for diffusing error between the halftone output value and the image data for the target pixel, the error being diffused to pixels adjacent the target pixel.

18. An apparatus according to claim 17, wherein image data for the target pixel is comprised of original image data plus accumulated error.

19. An apparatus according to claim 17, wherein said means for testing determines the presence of high frequency spatial characteristics based on a gradient between image data for the target pixel and at least one pixel adjacent the target pixel.

20. An apparatus according to claim 17, wherein in a case where said testing means determines that high frequency spatial characteristics are not present, said means for selecting selects a halftoning threshold whose spread varies from a fixed threshold in dependence on intensity of the image data.

21. An apparatus according to claim 20, wherein the spread increases at each intensity corresponding to formation of artifacts.

22. An apparatus according to claim 20, wherein the spread increases at each intensity corresponding to an integral fraction of the intensity range.

23. An apparatus according to claim 22, wherein at intervening non-integral fractions of the intensity range, the spread is reduced.

24. An apparatus according to claim 17, wherein in a case where said testing means determines that high frequency spatial characteristics are not present, said means for selecting comprises first means for selecting one of plural threshold masks based on intensity of the image data for the target pixel, and second means for selecting a halftoning threshold from the selected threshold mask.

25. An apparatus according to claim 24, wherein each of said plural threshold masks has only a limited number of threshold values, with spread of values in each such threshold mask varying based on its corresponding intensity level.

26. An apparatus for halftoning image data for each of plural pixels, comprising:
   a program memory for storing process steps executable to: (1) test to determine whether high frequency spatial characteristics are present in the image data at the target pixel, (2) select a halftoning threshold for the target pixel, the halftoning threshold being selected based on whether high frequency spatial characteristics are present at the target pixel, and further being selected in accordance with intensity of the image data at the target pixel in a case where high frequency spatial characteristics are not present, (3) determine a halftone output value for the target pixel based on a comparison between the selected threshold and the image data for the target pixel, and (4) diffuse error between the halftone output value and the image data for the target pixel, the error being diffused to pixels adjacent the target pixel; and
   a processor for executing the process steps stored in said program memory.

27. An apparatus according to claim 26, wherein image data for the target pixel is comprised of original image data plus accumulated error.

28. An apparatus according to claim 26, wherein in said testing step, the presence of high frequency spatial characteristics is determined based on a gradient between image data for the target pixel and at least one pixel adjacent the target pixel.

29. Apparatus according to claim 26, wherein in a case where said testing step determines that high frequency spatial characteristics are not present, said selecting step selects a halftoning threshold whose spread varies from a fixed threshold in dependence on intensity of the image data.

30. An apparatus according to claim 29, wherein the spread increases at each intensity corresponding to formation of artifacts.

31. An apparatus according to claim 29, wherein the spread increases at each intensity corresponding to an integral fraction of the intensity range.

32. An apparatus according to claim 31, wherein at intervening non-integral fractions of the intensity range, the spread is reduced.

33. An apparatus according to claim 26, wherein in a case where said testing step determines that high frequency spatial characteristics are not present, said selecting step comprises the steps of selecting one of plural threshold masks based on intensity of the image data for the target pixel, and selecting a halftoning threshold from the selected threshold mask.

34. An apparatus according to claim 33, wherein each of said plural threshold masks has only a limited number of threshold values, with spread of values in each such threshold mask varying based on its corresponding intensity level.

35. Computer-executable process steps stored on a computer readable medium, said computer-executable process steps for halftoning image data for each of plural pixels, said computer-executable process steps comprising:
   testing step to test to determine whether high frequency spatial characteristics are present in the image data at the target pixel;
   selecting step to select a halftoning threshold for the target pixel, the halftoning threshold being selected based on whether high frequency spatial characteristics are present at the target pixel, and further being selected in accordance with intensity of the image data at the target pixel in a case where high frequency spatial characteristics are not present;
   determining step to determine a halftone output value for the target pixel based on a comparison between the selected threshold and the image data for the target pixel; and
   diffusing step to diffuse error between the halftone output value and the image data for the target pixel, the error being diffused to pixels adjacent the target pixel.

36. Computer-executable process steps according to claim 35, wherein image data for the target pixel is comprised of original image data plus accumulated error.

37. Computer-executable process steps according to claim 35, wherein in said testing step, the presence of high frequency spatial characteristics is determined based on a gradient between image data for the target pixel and at least one pixel adjacent the target pixel.

38. Computer-executable process steps according to claim 35, wherein in a case where said testing step determines that high frequency spatial characteristics are not present, said selecting step selects a halftoning threshold whose spread varies from a fixed threshold in dependence on intensity of the image data.

39. Computer-executable process steps according to claim 38, wherein the spread increases at each intensity corresponding to formation of artifacts.

40. Computer-executable process steps according to claim 38, wherein the spread increases at each intensity corresponding to an integral fraction of the intensity range.

41. Computer-executable process steps according to claim 40, wherein at intervening non-integral fractions of the intensity range, the spread is reduced.

42. Computer-executable process steps according to claim 35, wherein in a case where said testing step determines that high frequency spatial characteristics are not present, said selecting step comprises the steps of selecting one of plural threshold masks based on intensity of the image data for the target pixel, and selecting a halftoning threshold from the selected threshold mask.

43. Computer-executable process steps according to claim 42, wherein each of said plural threshold masks has only a limited number of threshold values, with spread of values in each such threshold mask varying based on its corresponding intensity level.

44. An apparatus for halftoning image data for each of plural pixels, said apparatus comprising:
   first means for determining whether to apply one of plural threshold masks, or whether to apply a fixed threshold, based on the presence of high frequency spatial characteristics of the input image;
   means for selecting, in a case that one of plural threshold masks is to be applied, one of said plural threshold masks based on intensity of the image data for a target pixel plus an accumulated error;
   second means for determining a halftone output value for the target pixel based on a comparison between a selected threshold and the image data plus accumulated error for the target pixel; and
   means for diffusing error between the halftone output value and the image data plus accumulated error for the target pixel, the error being diffused to pixels adjacent the target pixel.

45. An apparatus according to claim 44, wherein each thresholding mask has only a limited number of threshold values, with each different one of the plural threshold masks being provided for a different segment of the input intensity range.

46. An apparatus according to claim 44, wherein each thresholding mask has only a limited number of threshold values, with a separate threshold mask being provided for each different input intensity value.

47. An apparatus according to claim 44, wherein the spread of values in each threshold mask varies based on its corresponding intensity level.

48. An apparatus according to claim 44, wherein the spread increases at each intensity range corresponding to formation of artifacts.

49. An apparatus according to claim 48, wherein at intervening non-integral fractions of the intensity range, the spread is reduced.

50. An apparatus according to claim 44, wherein the presence of high frequency spatial characteristics of the input image is determined based on a gradient test by which the spatial characteristics at each target pixel are determined based on whether there is a significant change relative to adjacent pixels.

51. An apparatus for halftoning image data for each of plural pixels, comprising:
   a program memory for storing process steps executable to: (1) determine whether to apply one of plural threshold masks, or whether to apply a fixed threshold, based on the presence of high frequency spatial characteristics of the input image, (2) select, in a case that one of plural threshold masks is to be applied, one of said plural threshold masks based on intensity of the image data for a target pixel plus an accumulated error, (3) determine a halftone output value for the target pixel based on a comparison between a selected threshold and the image data plus accumulated error for the target pixel, and (4) diffuse error between the halftone output value and the image data plus accumulated error for the target pixel, the error being diffused to pixels adjacent the target pixel; and
   a processor for executing the process steps stored in said program memory.

52. An apparatus according to claim 51, wherein each thresholding mask has only a limited number of threshold values, with each different one of the plural threshold masks being provided for a different segment of the input intensity range.

53. An apparatus according to claim 51, wherein each thresholding mask has only a limited number of threshold values, with a separate threshold mask being provided for each different input intensity value.

54. An apparatus according to claim 51, wherein the spread of values in each threshold mask varies based on its corresponding intensity level.

55. An apparatus according to claim 51, wherein the spread increases at each intensity range corresponding to formation of artifacts.

56. An apparatus according to claim 55, wherein at intervening non-integral fractions of the intensity range, the spread is reduced.

57. An apparatus according to claim 51, wherein the presence of high frequency spatial characteristics of the input image is determined based on a gradient test by which the spatial characteristics at each target pixel are determined based on whether there is a significant change relative to adjacent pixels.

58. Computer-executable process steps stored on a computer readable medium, said computer-executable process steps for halftoning image data for each of plural pixels, said computer-executable process steps comprising:

a testing step to test to determine whether to apply one of plural threshold masks, or whether to apply a fixed threshold, based on the presence of high frequency spatial characteristics of the input image;

a selecting step to select, in a case that one of plural threshold masks is to be applied, one of said plural threshold masks based on intensity of the image data for a target pixel plus an accumulated error;

a determining step to determine a halftone output value for the target pixel based on a comparison between a selected threshold and the image data plus accumulated error for the target pixel; and a diffusing step to diffuse error between the halftone output value and the image data plus accumulated error for the target pixel, the error being diffused to pixels adjacent the target pixel.

59. Computer-executable process steps according to claim 58, wherein each thresholding mask has only a limited number of threshold values, with each different one of the plural threshold masks being provided for a different segment of the input intensity range.

60. Computer-executable process steps according to claim 58, wherein each thresholding mask has only a limited number of threshold values, with a separate threshold mask being provided for each different input intensity value.

61. Computer-executable process steps according to claim 58, wherein the spread of values in each threshold mask varies based on its corresponding intensity level.

62. Computer-executable process steps according to claim 58, wherein the spread increases at each intensity range corresponding to formation of artifacts.

63. Computer-executable process steps according to claim 62, wherein at intervening non-integral fractions of the intensity range, the spread is reduced.

64. Computer-executable process steps according to claim 58, wherein the presence of high frequency spatial characteristics of the input image is determined based on a gradient test by which the spatial characteristics at each target pixel are determined based on whether there is a significant change relative to adjacent pixels.

* * * * *

UNITED STATES PATENT AND TRADEMARK OFFICE
CERTIFICATE OF CORRECTION

PATENT NO. : 6,356,362 B1
DATED : March 12, 2002
INVENTOR(S) : Victor Ostromoukhov It is certified that error appears in the above-identified patent and that said Letters Patent is hereby corrected as shown below:

Title page,
Item [56], References Cited, U.S. PATENT DOCUMENTS, "Ostormoukhov" (both occurrences) should read -- Ostromoukhov --; and "Noromura" should read -- Nonomura --;
References Cited, OTHER PUBLICATIONS, "vol.," should read -- vol. --; "pp;" should read -- pp. --; and "Couler" should read -- Couleur --.

Column 2,
Line 37, "a" should read -- an --.

Column 10,
Line 60, "to" (first occurrence) should read -- to be --.

Column 13,
Line 21, "member" should read -- method --.

Column 14,
Line 60, "Apparatus" should read -- An apparatus --.

Signed and Sealed this

Tenth Day of September, 2002

Attest:

JAMES E. ROGAN
Attesting Officer         Director of the United States Patent and Trademark Office